United States Patent Office 3,102,071
Patented Aug. 27, 1963

3,102,071
NEMATOCIDAL COMPOSITIONS
Edward B. Hodge, Terre Haute, Ind., assignor to Commercial Solvents Corporation, New York, N.Y., a corporation of Maryland
No Drawing. Filed Feb. 8, 1960, Ser. No. 7,109
6 Claims. (Cl. 167—33)

My invention relates to nematocidal compositions. More particularly, it relates to nematocidal compositions having as the active ingredient an imidazoline having the following general formula:

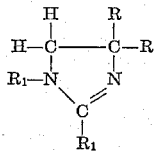

wherein R is a member selected from the group consisting of hydrogen and lower alkyl radicals and $R_1$ is alkyl.

The wide-spread presence of nematodes in soil throughout the United States results in great economic loss each year. Various nematodes reduce the production of many of the more important crops such as wheat, sugar beets, potatoes, soybeans and citrus fruits. However, nematodes very seldom kill the plants which they attack but deprive them of their normal growth. Losses thus inflicted by nematodes in this way constitute a serious economic problem.

In the past, many materials and classes of materials have been recommended as nematocides. A great majority of these compositions, however, have proven not to be practical nematocides due to lack of ready availability, cost, danger of application, etc. Of equal, if not greater importance, is the fact that a particular agent may be especially effective against one or several types of nematodes but be relatively ineffective on other nematodes when applied in practical quantities. Also, particular nematodes incline to become, over long periods of time, resistant to almost every kind of known nematocide.

The efficacy of a nematocidal composition is generally measured by the amount of the active ingredient necessary to kill all nematodes in a given area.

I have now discovered that compositions containing an imidazoline compound having the following formula:

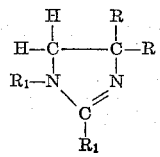

wherein R is a member selected from the group consisting of hydrogen and lower alkyl radicals and $R_1$ is alkyl, effectively destroy nematodes in the soil. Examples of the imidazolines useful in my invention include 1-isopropyl - 2-heptadecyl-4,4-dimethyl-2-imidazoline, 1-ethyl 2 - octyl-4,4-dimethyl-2-imidazoline, 1-butyl-2-nonyl-4,4-dimethyl - 2 - imidazoline, 1-propyl-2-heptadecyl-4,4-dimethyl-2-imidazoline, etc.

The exact quantity of the above compounds to be utilized in nematocidal compositions will vary widely and to a certain extent will depend upon the type of compositions in which the material is to be employed, method of application and the particular nematode to be destroyed. In general, however, I have found that concentrations as low as one part of the above imidazoline compounds in four million parts of a carrier are sufficient to destroy nematodes. For some requirements, however, stronger concentrations may be desirable.

In utilizing the nematocidal compositions of my invention, I can incorporate the named active compounds in any suitable carrier which is unreactive with the compounds. Since the active compounds are soluble in water, their aqueous solutions can be inexpensively and readily used. However, many different carriers including solid carriers such as diatomaceous earth, solid fertilizers, etc., can be used. Also, many other ingredients such as ammonia can be incorporated into the composition of my invention.

The compositions of my invention can be applied by any suitable means. One method is by spraying an aqueous solution of the active compounds directly on the ground. Another, when a solid carrier is desired, is by dusting the solid composition on the ground and allowing rain water or top-dressed water to leach the active compounds down into the soil.

The following examples are offered to illustrate the usefulness of my new compositions; however, I do not intend to be limited to the particular proportions, materials, etc., which are shown. Rather, I intend to include equivalents within the scope of my invention evident to those skilled in the art.

Example I

On each of ten dishes 25 mm. in diameter and 15 mm. deep, the bottoms being covered with filter paper, was placed 0.6 milliliter of egg yolk infusion. Several nematodes were then placed on each dish and kept at a temperature between 20° C. to 30° C. for five days. Ten similar dishes were prepared except that the egg yolk infusion contained one part in four million of 1-isopropyl-2 - heptadecyl-4,4-dimethyl-2-imidazoline. These dishes were also kept at a temperature of between 20° C. to 30° C. for five days. At the end of the five-day period it was observed that there were large numbers of active nematodes on each of the ten dishes having egg yolk infusion which contained no active nematocide. However, on the ten dishes having incorporated into the egg yolk the active composition, no nematodes remained alive.

Example II

The experiment of Example I was conducted except that the active ingredient contained in the egg yolk infusion was one part in one million of 1-ethyl-2-octyl-4,4-dimethyl-2-imidazoline instead of 1-isopropyl-2-heptadecyl-4,4-dimethyl-2-imidazoline. At the end of the five-day period there were a large number of active nematodes on each of the ten dishes having egg yolk infusion which contained no active nematocide. On the ten dishes having incorporated into the egg yolk infusion 1-ethyl-2-octyl-4,4-dimethyl-2-imidazoline, no nematodes remained alive.

Example III

The experiment of Example I was conducted except that the active ingredient contained in the egg yolk infusion was one part in one million of 1-butyl-2-nonyl-4,4-dimethyl-2-imidazoline instead of 1-isopropyl-2-heptadecyl-4,4-dimethyl-2-imidazoline. At the end of the five-day period there were a large number of active nematodes on each of the ten dishes having egg yolk infusion which contained no active nematocide. On the ten dishes having incorporated into the egg yolk infusion 1-butyl-2-nonyl-4,4-dimethyl-2-imidazoline, no nematodes remained alive.

Example IV

The experiment of Example I was conducted except that the active ingredient contained in the egg yolk infusion was one part in one million of 1-propyl-2-heptadecyl-4,4-dimethyl-2-imidazoline instead of 1-isopropyl-2-heptadecyl-4,4-dimethyl-2-imidazoline. At the end of the five-day period there were a large number of active nematodes on each of the ten dishes having egg yolk infusion which contained no active nematocide. On the ten dishes having incorporated into the egg yolk infusion 1-propyl-2-heptadecyl-4,4-dimethyl-2-imidazoline, no nematodes remained alive.

*Example V*

The experiment of Example I was conducted except that the active ingredient contained in the egg yolk infusion was one part in one million of 1-isopropyl-2-octyl-4,4-dimethyl-2-imidazoline instead of 1-isopropyl-2-heptadecyl-4,4-dimethyl-2-imidazoline. At the end of the five-day period there were a large number of active nematodes on each of the ten dishes having egg yolk infusion which contained no active nematocide. On the ten dishes having incorporated into the egg yolk infusion 1-isopropyl-2-octyl-4,4-dimethyl-2-imidazoline, no nematodes remained alive.

*Example VI*

0.1 gram of 1-isopropyl-2-heptadecyl-4,4-dimethyl-2-imidazoline was dissolved in 10 liters of water and the resulting solution was applied to sandy loam soil which was heavily infested with nematodes. The degree of concentration corresponded to 50 parts of the nematocidal agent per million parts by weight soil. At the end of 7 days no living nematodes were observed in the thus-treated soil.

Now having described my invention, what I claim is:

1. A process for destroying plant-infesting nematodes in the soil which comprises applying directly on the soil a compound represented by the following general formula:

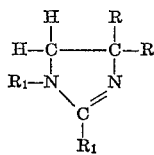

wherein R is a member selected from the group consisting of hydrogen and lower alkyl radicals and $R_1$ is alkyl.

2. A process for destroying plant-infesting nematodes in the soil which comprises applying directly on the nematodes one part to four thousand parts per four million parts of soil treated of a compound represented by the following general formula:

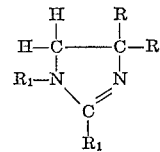

wherein R is a member selected from the group consisting of hydrogen and lower alkyl radicals and $R_1$ is alkyl.

3. The process of claim 2 wherein the compound is 1-isopropyl-2-heptadecyl-4,4-dimethyl-2-imidazoline.

4. The process of claim 2 wherein the compound is 1-ethyl-2-octyl-4,4-dimethyl-2-imidazoline.

5. The process of claim 2 wherein the compound is 1-butyl-2-nonyl-4,4-dimethyl-2-imidazoline.

6. The process of claim 2 wherein the compound is 1-propyl-2-heptadecyl-4,4-dimethyl-2-imidazoline.

References Cited in the file of this patent

UNITED STATES PATENTS

| | | |
|---|---|---|
| 2,728,643 | Vaughn | Dec. 27, 1955 |
| 2,728,644 | Vaughn | Dec. 27, 1955 |
| 2,728,645 | Vaughn | Dec. 27, 1955 |
| 2,728,646 | Vaughn | Dec. 27, 1955 |
| 2,728,647 | Vaughn | Dec. 27, 1955 |
| 2,813,862 | Arens | Nov. 19, 1957 |
| 2,953,492 | Duggins | Sept. 20, 1960 |

OTHER REFERENCES

Chwala: Ger. 704,410, Feb. 27, 1941, abstracted in Chem. Abstracts, vol. 36, #2091[6].

Boyce Thompson Inst. Contrib., vol. 14, pp. 151–171 (1946), abstracted in Chem. Abstracts, vol. 40, #4470[2,4].